US012314099B2

(12) United States Patent
Nandanwar et al.

(10) Patent No.: US 12,314,099 B2
(45) Date of Patent: May 27, 2025

(54) PREDICTIVE RUNTIME THERMAL MANAGEMENT SYSTEMS AND METHODS

(71) Applicant: QUALCOMM INCORPORATED, San Diego, CA (US)

(72) Inventors: Darshan Kumar Nandanwar, Bangalore (IN); Kartik Gunvantbhai Desai, Savarkundla (IN); Raghava Rao Mv, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 18/329,394

(22) Filed: Jun. 5, 2023

(65) Prior Publication Data

US 2024/0402772 A1    Dec. 5, 2024

(51) Int. Cl.
*G06F 1/28* (2006.01)
*G06F 1/20* (2006.01)

(52) U.S. Cl.
CPC ............... *G06F 1/206* (2013.01); *G06F 1/28* (2013.01)

(58) Field of Classification Search
CPC .................................. G06F 1/206; G06F 1/28
See application file for complete search history.

(56) References Cited

U.S. PATENT DOCUMENTS

| | | | | |
|---|---|---|---|---|
| 2007/0067136 A1* | 3/2007 | Conroy | ................... | G06F 1/206 713/300 |
| 2012/0271480 A1* | 10/2012 | Anderson | ............. | G06F 1/3206 700/299 |
| 2014/0285964 A1* | 9/2014 | Atkinson | ................ | G06F 1/203 361/679.46 |
| 2017/0344100 A1* | 11/2017 | Shi | .......... | G06F 1/206 |
| 2023/0205539 A1* | 6/2023 | Blagodurov | ............ | G06F 1/206 712/239 |
| 2024/0160260 A1* | 5/2024 | Ock | ......... | G06N 3/08 |
| 2024/0260230 A1* | 8/2024 | Bucci | ........ | G06F 1/20 |

* cited by examiner

*Primary Examiner* — Zahid Choudhury
(74) *Attorney, Agent, or Firm* — Smith Tempel Blaha LLC/Qualcomm (57) ABSTRACT

A system for performing predictive run-time thermal mitigation in a processor uses at least a first temperature sensor and a first power sensor or meter to measure a junction temperature, $T_{JUNC}$, value and power consumption, $P_{TOTAL}$, value in the processor and predicts what a temperature, $TEMP_{PRED}$, value of the processor will be in a later clock cycle of the processor based at least in part on the $T_{JUNC}$ and $P_{TOTAL}$ values. If the $TEMP_{PRED}$ value exceeds a preselected temperature threshold, $TH_{TEMP}$, value, one or more thermal mitigation actions are taken to ensure that a future $T_{JUNC}$ value measured n sample periods from the current sample period k of the processor will not exceed the $TH_{TEMP}$ value.

24 Claims, 6 Drawing Sheets

PREDICTIVE RUNTIME THERMAL MANAGEMENT SYSTEMS AND METHODS

DESCRIPTION OF THE RELATED ART

A computing device may include multiple processor-based subsystems. Such a computing device may be, for example, a portable computing device ("PCD"), such as a laptop or palmtop computer, a cellular telephone or smartphone, portable digital assistant, portable game console, etc. Still other types of PCDs may be included in automotive and Internet-of-Things ("IoT") applications.

These processor-based subsystems may be included within the same integrated circuit chip or in different chips. A "system-on-a-chip", or "SoC", is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other subsystems as well, such as, for example, a transceiver or "modem" subsystem that provides wireless connectivity, a memory subsystem, etc.

Processors of SoCs such as CPUs, GPUs and DSPs, for example, sometimes experience temperature increases due to external environmental factors and/or due to internal factors. Current SoCs employ one or more temperature sensors that sense temperature and output temperatures values. Thermal management circuits employed in the SoCs process the temperature values and perform thermal mitigation processes that mitigate these temperature increases.

As algorithm complexity, system core frequencies, and levels of integration continue to increase as packaging and form-factor sizes continue to decrease, thermal mitigation has become increasingly important, and there is a need for improvements in thermal management solutions.

SUMMARY OF THE DISCLOSURE

Systems, methods, and other examples are disclosed for performing predictive run-time thermal mitigation in a processor.

An exemplary embodiment of the method comprises, with at least a first temperature sensor and a first power sensor or meter, measuring a current junction temperature, $T_{JUNC}$, value in the processor and a current power, $P_{TOTAL}$, value consumed by the processor, respectively. The method can further comprise predicting what a temperature, $TEMP_{PRED}$, value of the processor will be in n sample periods from a current sample period of the processor based at least in part on the current $T_{JUNC}$ and $P_{TOTAL}$ values, where n is a positive integer. The method can further comprise, if the $TEMP_{PRED}$ value exceeds a preselected temperature threshold, $TH_{TEMP}$, value, causing one or more thermal mitigation actions to be taken.

An exemplary embodiment of the system includes at least a first temperature sensor and a first power sensor or meter configured to measure a current junction temperature, $T_{JUNC}$, value and a current power, $P_{TOTAL}$, value consumed by the processor, respectively, and logic configured to predict what a temperature, $TEMP_{PRED}$, value of the processor will be in n sample periods from a current sample period of the processor based at least in part on the current $T_{JUNC}$ and $P_{TOTAL}$ values, where n is a positive integer. The system can further include logic configured to determine if the $TEMP_{PRED}$ value exceeds a preselected temperature threshold, $TH_{TEMP}$, value, and logic configured to cause one or more thermal mitigation actions to be taken if the $TEMP_{PRED}$ value exceeds the preselected $TH_{TEMP}$ value.

An exemplary embodiment of a non-transitory computer-readable medium comprises computer instructions for execution by processor comprises a first set of computer instructions for receiving a current junction temperature, $T_{JUNC}$, value and a current power, $P_{TOTAL}$, value consumed by the processor measured by at least a first temperature sensor and a first power sensor or meter, respectively. The computer program can further comprise a second set of computer instructions for predicting what a temperature, $TEMP_{PRED}$, value of the processor will be in n sample periods from a current sample period of the processor based at least in part on the current $T_{JUNC}$ and $P_{TOTAL}$ values, where n is a positive integer. The computer program can further comprise a third set of computer instructions for determining if the $TEMP_{PRED}$ value exceeds a preselected temperature threshold, $TH_{TEMP}$, value. The computer program can further comprise a fourth set of computer instructions for causing one or more thermal mitigation actions to be taken if the $TEMP_{PRED}$ value exceeds the preselected $TH_{TEMP}$ value.

Another exemplary embodiment of the system comprises at least a first temperature sensor and a first power sensor or meter configured to measure a current junction temperature, $T_{JUNC}$, value and a current power, $P_{TOTAL}$, value consumed by the processor, respectively. The system can further comprise means for predicting what a temperature, $TEMP_{PRED}$, value of the processor will be in n sample periods from a current sample period of the processor based at least in part on the current $T_{JUNC}$ and $P_{TOTAL}$ values, where n is a positive integer. The system can further comprise means for determining if the $TEMP_{PRED}$ value exceeds a preselected temperature threshold, $TH_{TEMP}$, value. The system can further comprise means for causing one or more thermal mitigation actions to be taken if the $TEMP_{PRED}$ value exceeds the preselected $TH_{TEMP}$ value.

These and other features and advantages will become apparent from the following description, drawings and claims.

BRIEF DESCRIPTION OF THE DRAWINGS

In the Figures, like reference numerals refer to like parts throughout the various views unless otherwise indicated. For reference numerals with letter character designations such as "101a" or "101b", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The present disclosure discloses systems and methods for performing predictive run-time thermal mitigation in a processor that uses at least a first temperature sensor and a first power sensor or meter to measure a junction temperature, $T_{JUNC}$, value and power consumption, $P_{TOTAL}$, value, respectively, in the processor and then predicts what a temperature, $TEMP_{PRED}$, value of the processor will be in a later clock cycle of the processor based at least in part on the $T_{JUNC}$ and $P_{TOTAL}$ values. If the $TEMP_{PRED}$ value exceeds a preselected temperature threshold, $TH_{TEMP}$, value, one or more thermal mitigation actions are taken to help ensure that a future $T_{JUNC}$ value at n sample periods from the current sample period of the processor will not exceed the $TH_{TEMP}$ value.

In the following detailed description, for purposes of explanation and not limitation, exemplary, or representative, embodiments disclosing specific details are set forth in order to provide a thorough understanding of an embodiment according to the present teachings. The word "exemplary" is used herein to mean "serving as an example, instance, or illustration." The word "representative" may be used herein synonymously with "exemplary." Any aspect described herein as "exemplary" is not necessarily to be construed as preferred or advantageous over other aspects. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only and is not intended to be limiting. The defined terms are in addition to the technical and scientific meanings of the defined terms as commonly understood and accepted in the technical field of the present teachings.

As used in the specification and appended claims, the terms "a," "an," and "the" include both singular and plural referents, unless the context clearly dictates otherwise. Thus, for example, "a device" includes one device and plural devices.

Relative terms may be used to describe the various elements' relationships to one another, as illustrated in the accompanying drawings. These relative terms are intended to encompass different orientations of the device and/or elements in addition to the orientation depicted in the drawings.

It will be understood that when an element is referred to as being "connected to" or "coupled to" or "electrically coupled to" another element, it can be directly connected or coupled, or intervening elements may be present.

The term "memory" or "memory device", as those terms are used herein, are intended to denote a non-transitory computer-readable storage medium that is capable of storing computer instructions, or computer code, for execution by one or more processors. References herein to "memory" or "memory device" should be interpreted as one or more memories or more memory devices. The memory may, for example, be multiple memories within the same computer system. The memory may also be multiple memories distributed amongst multiple computer systems or computing devices.

A "processor", as that term is used herein encompasses an electronic component that is able to execute a computer program or executable computer instructions. References herein to a computer comprising "a processor" should be interpreted as one or more processors. The processor may for instance be a multi-core processor comprising multiple processing cores, each may comprise multiple processing stages of a processing pipeline. A processor may also refer to a collection of processors within a single computer system or distributed amongst multiple computer systems.

A computing device may include multiple subsystems, cores or other components. Such a computing device may be, for example, a PCD, such as a laptop or palmtop computer, a cellular telephone or smartphone, a portable digital assistant, a portable game console, etc.

Dynamic thermal management (DTM) techniques have been proposed to save on thermal packaging and cooling costs for general purpose processors. However, when invoked, these techniques result in a significant processor performance degradation. Current DTM solutions are usually reactive in nature, i.e., they take thermal mitigation steps after the sensed temperature exceeds a preselected threshold (TH) value. Such algorithms have significant invocation time overhead during a thermal emergency (~600 microsecond (µs) of reaction time) and empirically have been shown to result in a 5% to 10% performance degradation for benchmarks. The higher invocation time overhead leads to an increase in heat flux.

In addition, the temperature sensors are typically located in thermal hotspots of the PCD and many high-power-density areas of the PCD may not be covered by the temperature sensors. It is impractical to include temperature sensors at every location in the SoC at which it may be advantageous to sense temperature. Consequently, there is a high likelihood of running the PCD at a high temperature for long periods of time before a temperature sensor detects the high temperature and the DTM system begins taking steps to perform thermal mitigation.

Furthermore, many DTM systems over-mitigate in an attempt to lower the heat-flux and sometimes under-mitigate through sub-optimal voltage/frequency corner selection. In the latter case, toggling between corners can result in processor performance degradation.

An additional disadvantage of reactive DTM approaches is that they can induce electromigration and hot-carrier-injections (HCI) in the silicon dioxide of the processor, which can cause the processor to age faster. Aging of the processor caused by continuous exposure of the PCD to high temperatures slows the processor down over time, resulting in reduced performance.

The present disclosure discloses a power-profile aware predictive DTM system and method that are suitable for any applications in any subsystems and that allow thermal mitigation response mechanisms to be efficiently used, even those that have high invocation time overhead, while also achieving better subsystem performance. Thus, the predictive DTM systems, methods and algorithms of the present disclosure provide a significantly better solution than existing reactive DTM algorithms.

Figure 1:
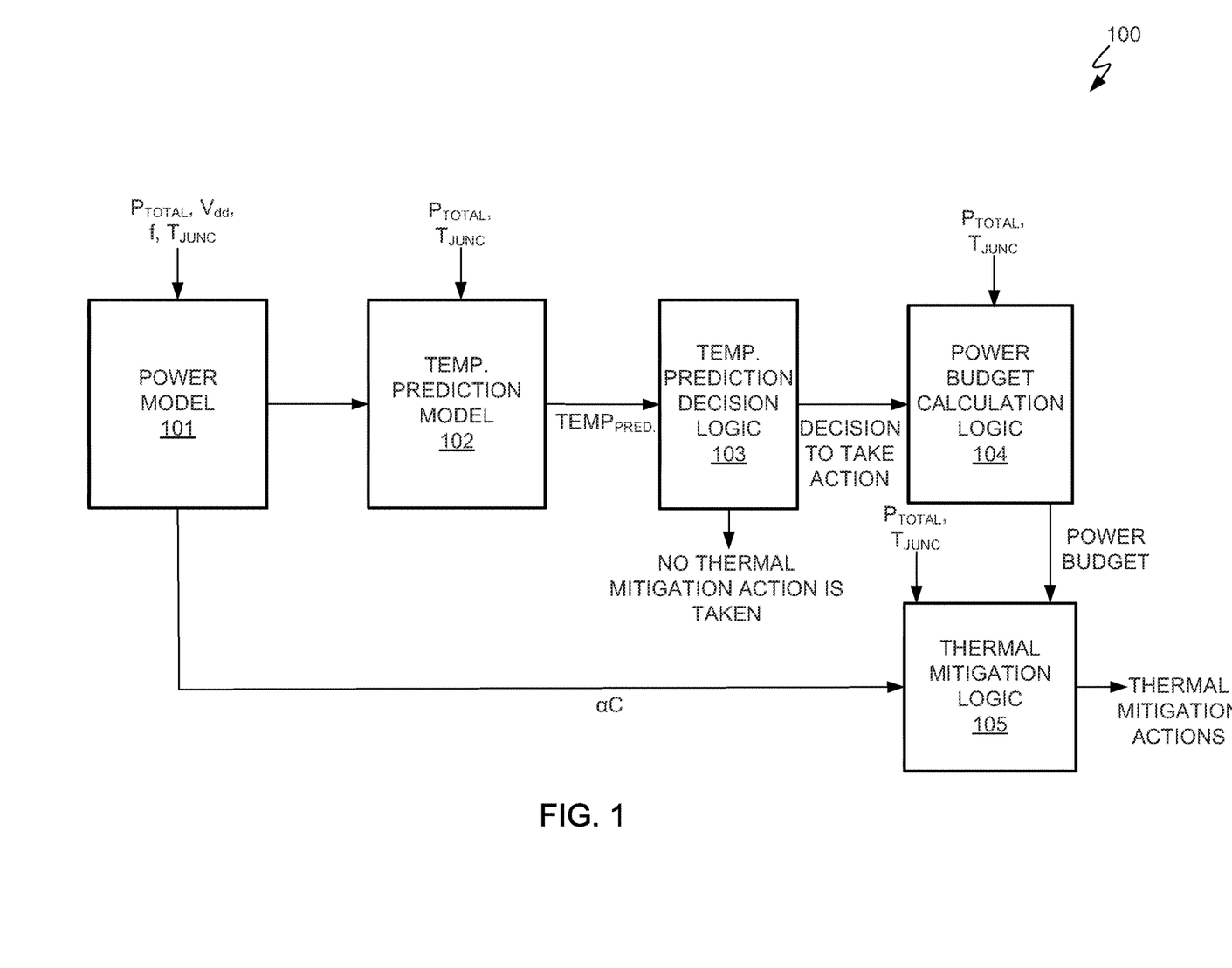
FIG. 1 is a block diagram of the system in accordance with a representative, or exemplary, embodiment of the predictive run-time thermal management system of an SoC of a PCD.

FIG. 1 is a block diagram of a representative, or exemplary, embodiment of a predictive run-time thermal management system 100 of an SoC of a PCD. A power model 101 is pre-configured (i.e., prior to run-time) to receive, at run-time, a junction temperature measurement value, $T_{JUNC}$, sensed by a temperature sensor (not shown) of the SoC, a supply voltage value, $V_{dd}$, of the processor(s) that is running the system 100 (e.g., a central processing unit (CPU) of the SoC), and a frequency, f, at which the processor(s) is currently operating.

Temperature sensors for sensing junction temperature are typically disposed inside of the processor, such as at one or more locations in the processor pipeline (e.g., in the load-store unit (LSU) of the processor pipeline), and/or at locations in the processor pipeline at which heat flux is proportional to load variations. The power model 101 also receives the current power being consumed by the processor, $P_{TOTAL}$, from either a power sensor or a digital power meter (DPM) that senses the $P_{TOTAL}$ value or obtains measurements of microarchitectural events occurring in the processor pipeline that are then used to calculate the $P_{TOTAL}$ value. If a power sensor is used, it will typically be electrically coupled to the supply voltage rail of the power domain of the processor. If a DPM is used for this purpose, the need for power sensors connected to the supply voltage rails of the processor's power domain may be eliminated. DPMs measure power based on a weighted sum of all microarchitectural events occurring in the processing pipeline and their power contributions during the sampling period. Hence, power sensor readings may not be needed if a DPM is used for this purpose.

As will be described below in more detail with reference to FIGS. 2 and 3, the power model 101 runs on a processor of the system 100 that is pre-configured to process these values at run-time and to output an αC value, which is a term associated with the dynamic power component of $P_{TOTAL}$. As will be described below in more detail, the αC value is subsequently used by thermal mitigation logic 105 to determine whether a power budget computed by power budget calculation logic 104 is violated, and if so, to cause one or more thermal mitigation measures to be taken. It should be noted that the term "processor", as used in this and subsequent paragraphs, can mean the processor overall or one or more processing cores of the processor. In other words, the process performed by the power model 101 can be performed on a per core basis or for the processor as a whole.

The $P_{TOTAL}$ value and the $T_{JUNC}$ value are received by a temperature prediction model 102 that has been pre-configured to receive the $P_{TOTAL}$ value and $T_{JUNC}$ value at run-time and to calculate a predicted temperature value, $TEMP_{PRED}$. The manner in which the temperature prediction model 102 is pre-configured and the manner in which it calculates the $TEMP_{PRED}$ value are described below in more detail.

This predicted temperature value, $TEMP_{PRED}$, is a prediction of the temperature that is expected to be reached within a predetermined number, n, of clock cycles (e.g., 3 clock cycles) from a current clock cycle of the processor if some action is not immediately taken, where n is a positive integer that is preselected and can be updated, or tuned, by the user to ensure that the $TEMP_{PRED}$ value is obtained sufficiently in advance of a thermal emergency occurring to allow mitigation steps to be taken sufficiently in advance to prevent a thermal emergency from occurring.

The $TEMP_{PRED}$ value is outputted to temperature prediction decision logic 103 that compares the $TEMP_{PRED}$ value to a preselected temperature threshold (TH) value, $TH_{TEMP}$. The $TH_{TEMP}$ value is a configurable value that can be stored in a register of the processor and updated, or tuned, as needed. For compute/mobile platforms, a typical value for $TH_{TEMP}$ may be, for example, 95° C., whereas for automotive use cases, a typical value for $TH_{TEMP}$ may be, for example, 115° C. If the $TEMP_{PRED}$ value does not exceed the $TH_{TEMP}$ value, no thermal mitigation action is taken and the processor continues to operate as usual using its normal default values.

If the $TEMP_{PRED}$ value exceeds the $TH_{TEMP}$ value, then some type of thermal mitigation action may need to be taken. In this case, the temperature prediction decision logic 103 outputs an indication to power budget calculation logic 104 that thermal mitigation may be needed. The power budget calculation logic 104 receives this indication and also receives the $P_{TOTAL}$ value, the current $T_{JUNC}$ value, and other values described in more detail below, which it uses in a manner described below in more detail to calculate a power budget. The calculated power budget is output to thermal mitigation logic 105. The thermal mitigation logic 105 also receives the αC value computed by the power model 101, the $P_{TOTAL}$ value and the $T_{JUNC}$ value. The thermal mitigation logic 105 processes all of these values to determine whether or not the current $P_{TOTAL}$ and $T_{JUNC}$ values will result in the power budget being violated.

A violation of the power budget is an indication that a future $T_{JUNC}$ value n clock cycles from the current clock cycle is likely to exceed $TH_{TEMP}$. To prevent this from happening, if the thermal mitigation logic 105 determines that the current $P_{TOTAL}$ and $T_{JUNC}$ values will result in the power budget being violated, it causes one or more thermal mitigation steps to be taken to ensure that the power budget is not violated, which ensures that a future $T_{JUNC}$ value n clock cycles from the current clock cycle will not exceed $TH_{TEMP}$. In other words, meeting the power budget prevents the future $T_{JUNC}$ value from exceeding the $TH_{TEMP}$ value. The process preferably is an iterative process that continues to be performed until the temperature prediction decision logic 103 determines that the current $TEMP_{PRED}$ value no longer exceeds the $TH_{TEMP}$ value.

Figure 2:
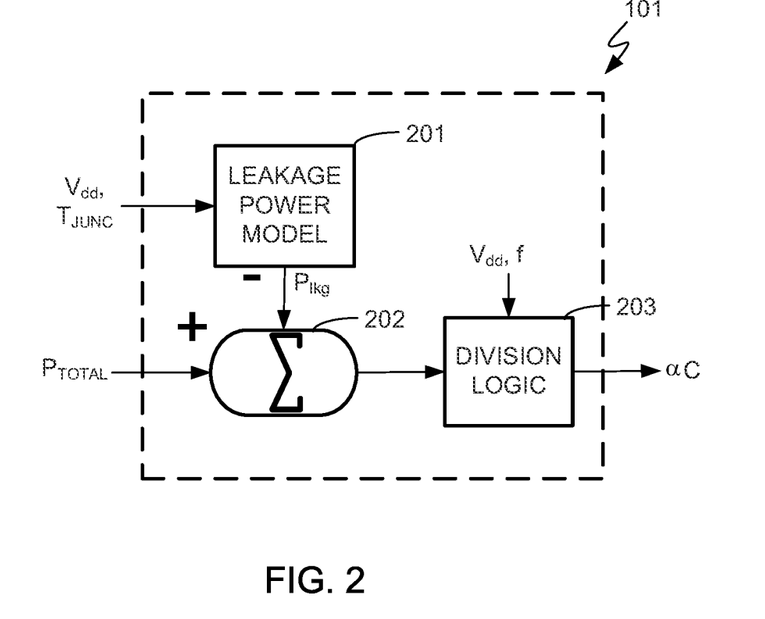
FIG. 2 is a block diagram of the power model shown in FIG. 1 comprising a leakage power model, summation logic and division logic.

FIG. 2 is a block diagram of the power model 101 shown in FIG. 1 in accordance with a representative, or exemplary, embodiment comprising a leakage power model 201, summation logic 202 and division logic 203. As discussed above, the power model 101 receives values for $P_{TOTAL}$, $V_{dd}$, f, and $T_{JUNC}$ and processes those values to calculate the αC value. Below is a set of equations that show the exemplary relationships between these and other parameters.

$$P_{total} = P_{dynamic} + P_{lkg} \qquad \text{Eq. 1}$$

$$P_{total} = \alpha C V^2 f + V I_{lkg} \qquad \text{Eq. 2}$$

$$I_{lkg} = \beta_s \left(\frac{W}{L}\right)\left(\frac{KT^2}{q}\right) e^{\frac{q(Vgs-vTh)}{nKT}} + I_{gate} \qquad \text{Eq. 3}$$

$$I_{lkg} = \Phi(T^2) e^{\psi/T} + I_{gate} \qquad \text{Eq. 4}$$

$$P_{total} = \alpha C V^2 f + V(\emptyset T^2 e^{\psi/T} + I_{gate}) \qquad \text{Eq. 5}$$

where $\beta_s$ is a technology-dependent parameter, a is the fraction of the clock cycle when the gate switches, C is the dynamic capacitance associated with switching, αC is the dynamic switching capacitance, V is the supply voltage, Vgs is the gate-to-source voltage, f is the clock frequency, and $V_{TH}$ is the threshold voltage. As indicated above, the $P_{TOTAL}$ value is either measured by a power sensor or with a DPM and therefore is a known value provided to the power model 101. The $V_{dd}$ and f values are also known values provided to the power model 101.

The leakage power, $P_{lkg}$, shown in Eq. 1 is calculated by the leakage power model 201 shown in FIG. 2 using the known or measured values for $V_{dd}$ and $T_{JUNC}$, and matrices for thermal conductance, Φ, thermal capacitance, Ψ, and gate current, $I_{gate}$, that are obtained during the design phase of the SoC and saved in on-board memory (e.g., in a look-up table) of the processor or in some other memory device of the SoC for use by the power model 101 at run-time. After these matrices are obtained during the design phase, their values can be modified post-production of the SoC to ensure that the values being used by the leakage power model 201 at run-time are as accurate as possible.

Using the values of these matrices and the other known values provided to the power model 101, the $P_{lkg}$ value of Eq. 1 is calculated at run-time by the leakage power model 201. $P_{lkg}$ is the power consumed by the processor when at least one core of the processor is on, but no core of the processor is actively executing instructions. Summation logic 202 subtracts the $P_{lkg}$ value from the $P_{TOTAL}$ value at run-time to obtain a value equal to the dynamic power, $P_{dynamic}$, shown in Eq. 1 and expressed in Eq. 2 as $\alpha CV^2_{dd}f$. Division logic 203 then divides this $P_{lkg}$ value by $V^2_{dd}f$ to obtain the value for αC, which is then sent to the thermal mitigation logic 105 (FIG. 1) to be processed in a manner discussed below in more detail. In cases where the temperature prediction decision logic 103 determines that the $T_{JUNC}$ value exceeds the $TH_{TEMP}$ value, the power budget calculation logic 104 calculates the power budget at run-time.

The power model 101 can be implemented in hardware, software, firmware, or a combination thereof. For example, the leakage power model 201 may be implemented in software and/or firmware while the summation logic 202 and the division logic 203 may be implemented in hardware. As will be understood by persons of skill in the art, functions that are implemented in hardware can typically be implemented in software and/or firmware, and vice versa.

As indicated above, the thermal mitigation logic 105 determines whether or not the current $T_{JUNC}$ and $P_{TOTAL}$ values will result in a violation of the power budget in n clock cycles from the current clock cycle, k, and if so, proactively takes one or more thermal mitigation steps to ensure that the future $T_{JUNC}$ value n cycles from the current clock cycle k will not exceed the $TH_{TEMP}$ value. The temperature prediction model 102 performs processes that can be exemplarily based on the following equations:

$$Ct\frac{dT}{dt} = -G_sT(t) + P(t) \qquad \text{Eq. 6}$$

$$T|k+1|(I - T_s - G_tC_t^{-1})T|k| + T_sC_t^{-1}P|k| \qquad \text{Eq. 7}$$

$$T|k+n| = \phi s^n T|k| + \psi s \sum_{i=0}^{n-1} \phi s^i P|k+n-i-1| \qquad \text{Eq. 8}$$

Eq. 7 is derived from Eq. 6 and Eq. 8 is derived from Eq. 7. In Equation 7, Ct and Gr are the aforementioned thermal capacitance and thermal conductance matrices, respectively. In Eq. 8, Φ and Ψ are the thermal conductance and thermal capacitance matrices, respectively. As indicated above, the thermal conductance and thermal capacitance matrices, Φ and Ψ, respectively, are determined during the SoC design phase and preferably are modified if necessary post-production. The $P_{TOTAL}$ and $T_{JUNC}$ discrete-time series, P [k] and T [k], respectively, can be measured by randomly varying the frequency of the cores between a minimum frequency and a maximum frequency and measuring the corresponding P [k] and T [k] values over time. The term P [k+n−i−1] in Eq. 8, which is the discrete-time representation of $P_{TOTAL}$ n clock cycles from the current clock cycle, is the output of a first stage of the power model 101 that is processed by the stage of the power model 101 shown in FIG. 2 to compute the αC value. In Equations 7 and 8, k represents the current clock cycle. The temperature prediction model 102 uses the $T_{JUNC}$ value and the $P_{TOTAL}$ value to predict what the temperature will be n sample periods from the current sample period k if power consumed remains constant for n cycles. The temperature prediction decision logic 103 compares the predicted temperature of Eq. 8, T|k+n|, to $TH_{TEMP}$ to determine whether the predicted temperature exceeds $TH_{TEMP}$, and if so, the power budget calculation logic 104 performs the power budget calculation.

It should be noted that processes based on mathematical expressions other than Equations 6-8 can be used to calculate the predicted temperature at n clock cycles from the current clock cycle. The processes represented by Equations 6-8 are merely examples of processes that can be used for this purpose. Persons of skill in the art will understand, in view of the description provided herein, the manner in which other processes can be used to calculate the predicted temperature.

In accordance with a representative embodiment, the power budget calculation performed by the power budget calculation logic 104 can be exemplarily expressed in Eq. 10 below:

$$\max\{|\phi s, iT|k| + \psi s, iP|k|\} \le |T\max| \text{ where } 1 <= i <= n \qquad \text{Eq. 9}$$

$$\psi s, iP|k|| <= |T\max| - |\phi s, iT|k|| \text{ where } 1 <= i <= n \qquad \text{Eq. 10}$$

Based on the thermal conductance matrix, Φ, the thermal capacitance matrix Ψ and the current power consumption value, $P_{TOTAL}$, which is represented in discrete time as P|k| in Eq. 10, the logic 104 uses Eq. 10 to compute the power budget. In Equations 9 and 10, Tmax is the same as the temperature threshold value, $TH_{TEMP}$, that is compared by the temperature prediction decision logic 103 to $TEMP_{PRED}$. The current power consumption P|k| from the current sample period k until n sample periods later should be maintained in accordance with Eq. 10 such that ψs, i P|k||<=|Tmax|−|Øs, i T|k|| for i sample periods, where 1<i<n. After the power budget calculation logic 104 exemplarily calculates the power budget using Eq. 10, the thermal mitigation logic 105 uses the calculated power budget in Eq. 9 to exemplarily determine whether the current $P_{TOTAL}$ and $T_{JUNC}$ values, if maintained over the next n clock cycles, will lead to a violation of Eq. 9. If so, then unless thermal mitigation steps are taken, the actual junction temperature will not be maintained below the $TH_{TEMP}$ value after n clock cycles. In the latter case, the thermal mitigation logic 105 will cause one or more of the thermal mitigation steps discussed below to be taken. An example of the manner in which the power budget is calculated using Eq. 10 and of the manner in which a determination is made as to whether the power budget has been violated using Eq. 9 is described below with reference to FIG. 5.

If the thermal mitigation logic 105 determines that Eq. 9 is violated, it causes one or more of the following thermal mitigation actions to be taken. One or more of a variety of thermal mitigation actions can be taken, such as, for example, (1) instruction throttling in one or more of the cores of the processor to cause fewer instructions to be executed per clock cycle or per a given number of clock cycles (e.g., by inserting idle instructions), (2) selecting a different V/f corner for operations that reduces power usage, (3) task migration performed by the operating system (OS) of the processor to offload processing from one core to another core of the processor or from one processor to another processor of the SoC, and (4) deactivating one or more cores to lower power usage. Any of these thermal mitigation actions can detrimentally impact performance, so determining which of these actions to take can depend on a variety of other factors.

It should be noted that processes based on mathematical expressions other than Equations 9 and 10 can be used to calculate the power budget and determine whether or not it has been violated. The processes represented by Equations 9 and 10 are merely examples of processes that can be used to calculate the power budget and determine whether or not it has been violated. Persons of skill in the art will understand, in view of the description provided herein, the manner in which other processes can be used to perform these tasks.

For example, the power budget calculation logic 104 can also exemplarily use a process that is based on Eq. 5 in determining whether the calculated power budget has been violated. With respect to Eq. 5, if $P_{TOTAL}$ is set equal to the calculated power budget and the known or measured values for αC, $T_{JUNC}$, the thermal capacitance matrix, the thermal conductance matrix, and the Igate matrix are used in the equation, compliance with Eq. 5 can be achieved by changing the values of $V_{dd}$ and f to change the V/f corner at which the processor operates in accordance with option (2) above to perform thermal mitigation. In this way, changing the V/f corner can be used as a thermal mitigation step to prevent the future value of $T_{JUNC}$ at n clock cycles from the current clock cycle k from exceeding the $TH_{TEMP}$ value.

Figure 3:
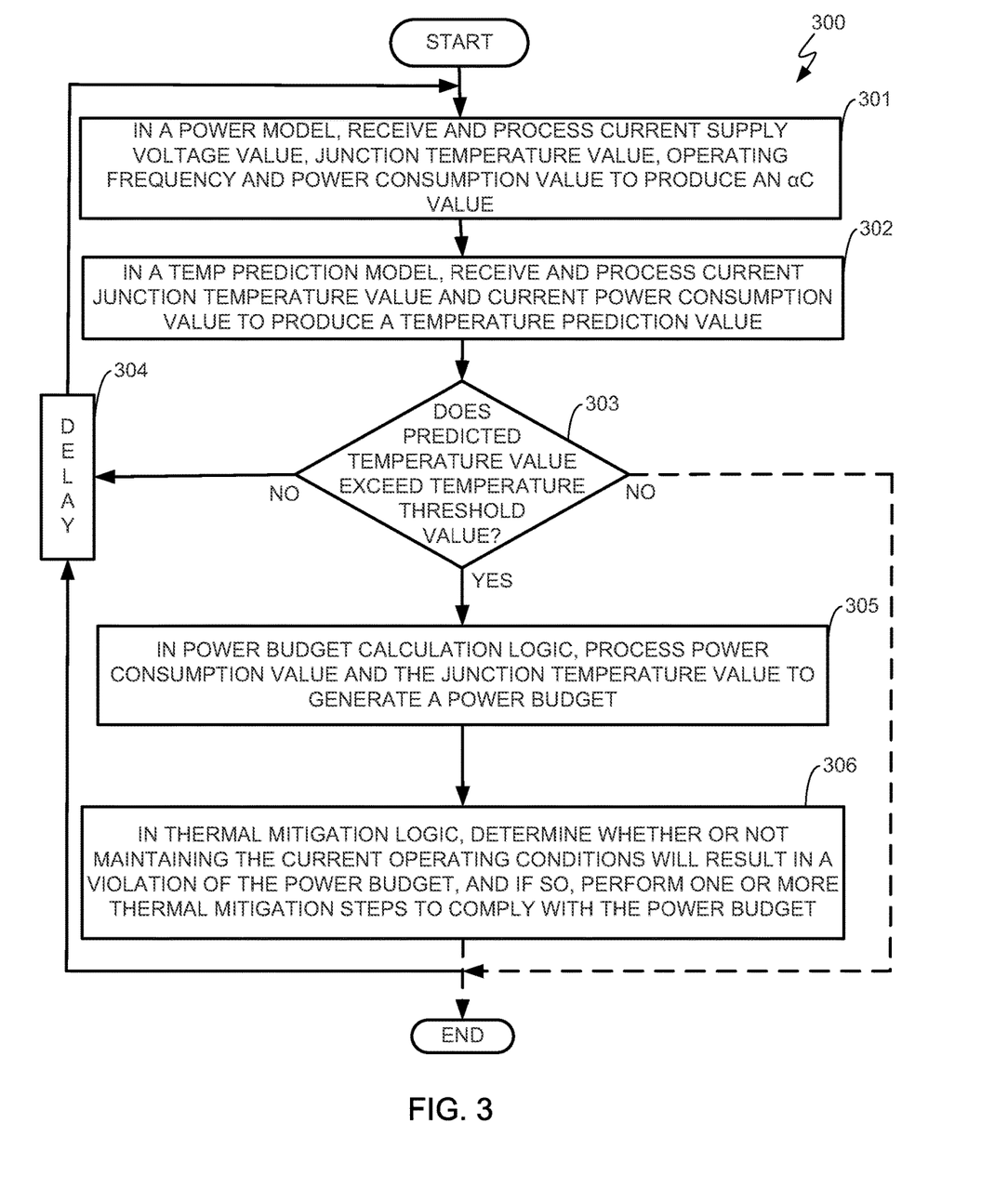
FIG. 3 is a flow diagram of the method in accordance with a representative, or exemplary, embodiment for performing predictive run-time thermal management in an SoC of a PCD.

FIG. 3 is a flow diagram of the method in accordance with a representative, or exemplary, embodiment for performing predictive run-time thermal management in an SoC of a PCD. Block 301 represents the process of receiving the current values for $V_{dd}$, f, and $T_{JUNC}$, and $P_{TOTAL}$ in the power model 101 and processing these values to produce the αC value. Block 302 represents the process of receiving the current values for $P_{TOTAL}$ and $T_{JUNC}$ in the temperature prediction model 102 and processing these values to produce the temperature prediction value, $TEMP_{PRED}$. Block 303 represents the process of logic 103 comparing the temperature prediction value $TEMP_{PRED}$ to the temperature threshold value $TH_{TEMP}$ to determine whether the predicted temperature value exceeds the $TH_{TEMP}$ value. If not, the process can end or restart after a delay of X seconds, where X is a positive value representing a preselected amount of time that will pass before the process represented by the flow diagram repeats. Block 304 represents a delay loop that delays returning to block 301 until X s have passed.

If a determination is made at block 303 that $TEMP_{PRED}$ exceeds $TH_{TEMP}$, then the process moves to block 305 at which the power budget calculation logic 304 processes the $P_{TOTAL}$ value and the $TEMP_{PRED}$ value to produce the power budget according to Eq. 10. Block 306 represents the process of the thermal mitigation logic 105 determining whether the current conditions will lead to a violation of the power budget, and if so, causing one or more thermal mitigation actions of the type described above to be taken to ensure compliance with the power budget. As indicated above, compliance with the power budget helps ensure that the future $T_{JUNC}$ value n clock cycles after the current clock cycle will not exceed $TH_{TEMP}$. The process can then end or return to block 301 after the delay represented by block 304. In other words, the process of continuing to take one or more thermal mitigation steps and exemplarily solving Eq. 9 to determine whether it is satisfied can reiterate until logic 104 determines that the power budget is no longer violated.

Figure 4:
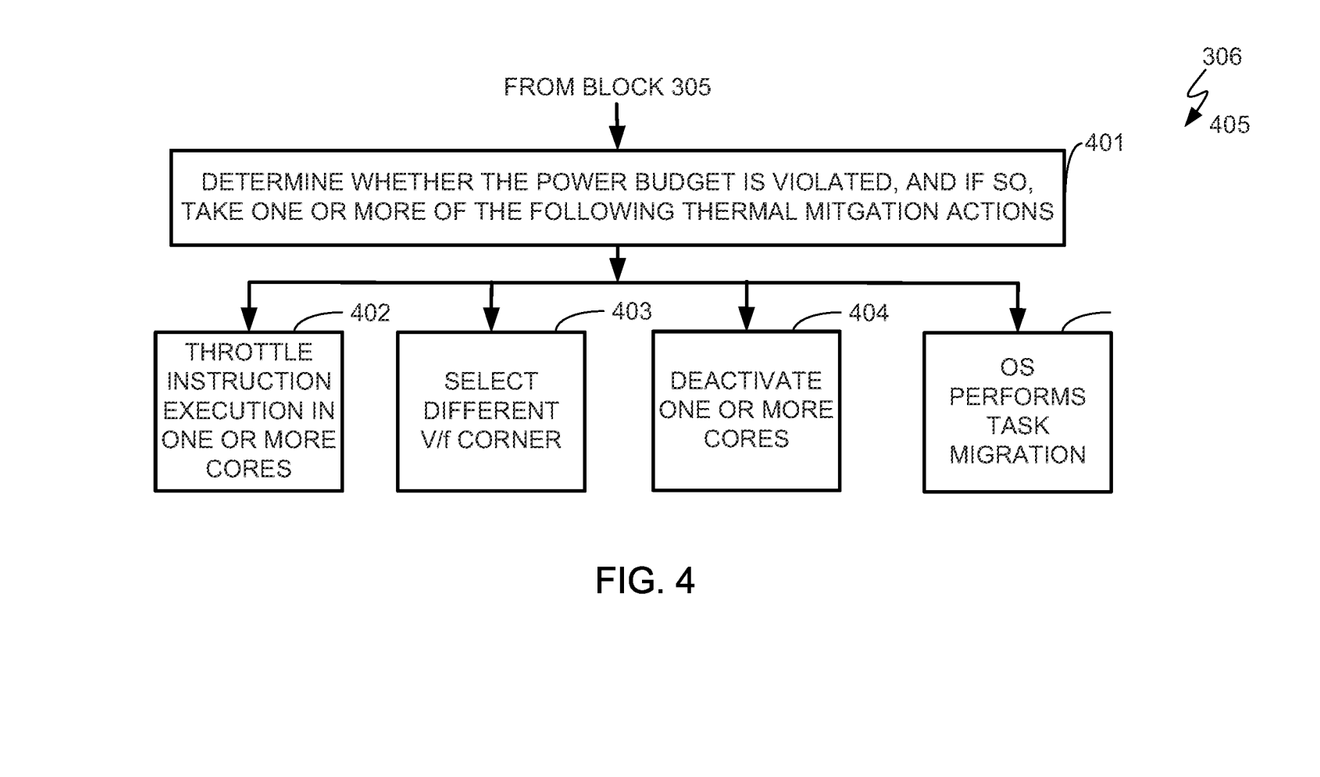
FIG. 4 is a flow diagram of the process represented by block 306 of FIG. 3 in accordance with a representative embodiment.

FIG. 4 is a flow diagram of the process represented by block 306 of FIG. 3 in accordance with a representative embodiment. At block 401, the thermal mitigation logic 105 determines whether the power budget is violated, and if so, causes one or more thermal mitigation actions to be taken to comply with the power budget. Blocks 402-405 represent examples of the different thermal mitigation actions that can be taken. It should be noted that these are examples of thermal mitigation actions that can be taken and that other thermal mitigation actions can be taken alone or in combination with one or more of those represented by blocks 402-405.

Block 402 represents instruction execution throttling in one or more of the cores of the processor to cause fewer instructions to be executed per clock cycle or per a given number of clock cycles (e.g., by inserting idle instructions). It is possible that one of the cores of the processor has a pipeline stage that is executing a greater number of instructions than the others and is mainly responsible for the prediction that $T_{JUNC}$ will exceed $TH_{TEMP}$. In such cases, if it is known which core is responsible, the thermal mitigation logic 105 can throttle instruction execution of one of the pipeline stages of the responsible core.

Block 403 represents selecting a different V/f corner for operations to reduce power usage. There are typically about fifteen V/f corners that can be selected and toggled between. Selecting a different V/f corner can result in lowering $T_{JUNC}$, but can also reduce performance, as can throttling instruction execution.

Block 404 represents deactivating one or more cores to lower power usage. It is possible that more cores are active than are actually needed for the processing load. In such cases, the thermal mitigation logic 105 can deactivate one or more cores and/or a more efficient subset of cores for handling the processing load.

Block 405 represents task migration performed by the OS of the processor to offload processing from one core to another core of the processor or from one processor to another processor of the SoC to lower power usage and thereby reduce the predicted temperature. Any of these thermal mitigation actions can be taken along or in combination with the others. The actions that are taken will depend at least partly on the calculated power budget, but may also depend on the amount by which $TEMP_{PRED}$ exceeds $TH_{TEMP}$.

Preferably, if the decision of block 303 of FIG. 3 is answered in the affirmative, the mitigation action represented by block 403 of selecting a different V/f corner to be used will always be taken and one or more additional mitigation actions represented by blocks 402, 404 and 405 may also be taken.

Figure 5:
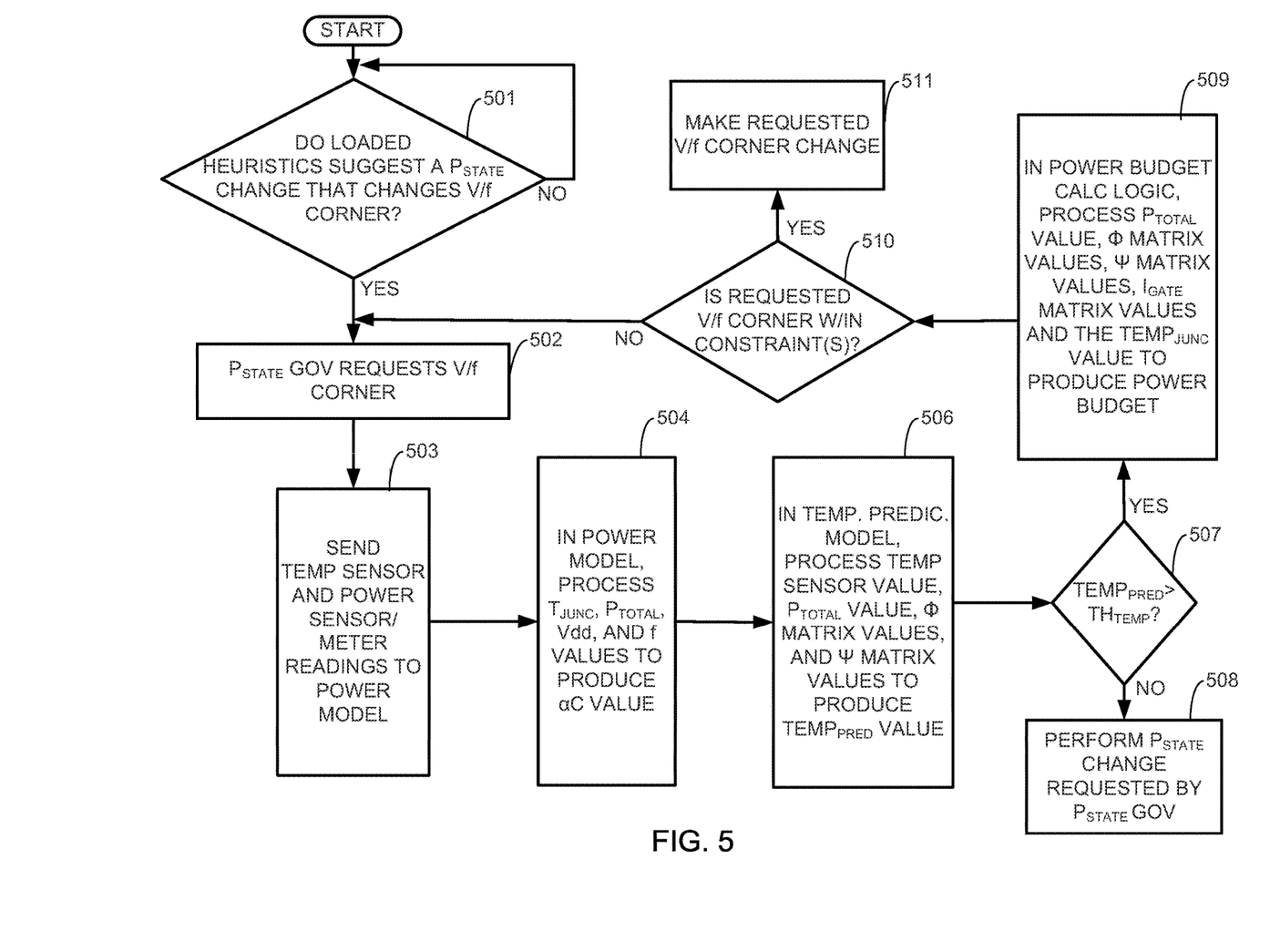
FIG. 5 is a flow diagram of the method in accordance with a representative embodiment for performing predictive run-time thermal management in an SoC of a PCD for the case where the thermal mitigation action corresponds to block 403 of FIG. 4.

FIG. 5 is a flow diagram of the method in accordance with a representative embodiment for performing predictive run-time thermal management in an SoC of a PCD for the case where the thermal mitigation action corresponds to block 403 of FIG. 4. Many SoCs of PCDs employ dynamic voltage and frequency scaling (DVFS) governors that dynamically change the power state (Pstate) of the processors based on some type of heuristics algorithm. A typical DVFS governor changes the Pstate by selecting a different V/F corner when the heuristics warrant a change. The DVFS governor algorithm is typically launched when an interrupt or some other event occurs. In accordance with this representative embodiment, the method and system of the present disclosure operate in conjunction with such a DVFS governor and associated algorithm. It should be noted, however, that the system and method of the present disclosure can be used without a DVFS governor or independent of algorithms performed by DVFS governors.

In accordance with this exemplary embodiment, the predictive run-time thermal management method commences when a power management IC (PMIC) of the SoC detects a change in the state, $P_{STATE}$, of a power management state machine of the PMIC that indicates that a request is to be made for a new V/F corner. When a determination is made at block 501 that a change in $P_{STATE}$ is being made that will result in a request for a new V/f corner by the $P_{STATE}$ governor, the $P_{STATE}$ governor requests a new V/f corner for the processor to operate on, as indicated by block 502. It should be noted that the DVFS governor processes represented by blocks 501 and 502 are optional.

Blocks 504-508 generally represent the same processes represented by blocks 301-305 of FIG. 3. Block 503 represents the process of reading the $T_{JUNC}$ sensor and the power sensor or meter and sending those readings to the power model 101. Block 504 represents the process performed by logic of the power model 101 that processes these values to produce the αC value and forwards it to the thermal mitigation logic 105. Block 506 represents the process performed by the temperature prediction model 102 that processes the $P_{TOTAL}$ value along with the Φ and Ψ matrix values in accordance with Eq. 8, repeated below for convenience, to predict the junction temperature, $TEMP_{PRED}$, over the next n sample periods, where n is a positive integer that is greater than or equal to one:

$$T|k+n| = \emptyset s^n T|k| + \psi s \sum_{i=0}^{n-1} \emptyset s^i P|k+n-i-1| \qquad \text{Eq. 8}$$

where T|k+n| is the discrete-time representation of $TEMP_{PRED}$ over the next n sample periods. T|k| is the discrete-time representation of $TEMP_{PRED}$ at the current sample period, k. P|k+n−i−1| is the discrete-time representation of $P_{TOTAL}$ at sample period i where 0<i<n−1, $\emptyset_s^i$ is the discrete-time representation of the thermal conductance matrix, and ψs is the discrete-time representation of the thermal capacitance matrix.

Block 507 represents the process of comparing the predicted $T_{JUNC}$ value, $TEMP_{PRED}$, to $TH_{TEMP}$. If a determination is made at block 507 that $TEMP_{PRED}$ does not exceed $TH_{TEMP}$, then the process proceeds to block 508 at which the V/f corner requested by the $P_{STATE}$ governor at block 502 is granted. If a determination is made at block 507 that $TEMP_{PRED}$ exceeds $TH_{TEMP}$, then the process proceeds to block 509 at which the power budget calculation logic 104 processes the $P_{TOTAL}$ value, the $T_{JUNC}$ value and the matrices for Igate, Φ and Ψ to determine the power budget based on the Eq. 10, repeated below for convenience:

$$\psi s, iP|k| \leq |T\max| - |\emptyset s, iT|k|| \text{ where } 1 \leq i \leq n \qquad \text{Eq. 10}$$

A decision is then made at block 510 by the thermal mitigation logic 105 as to whether or not operating the processor at the requested V/F corner will exceed the power budget. If not, the requested V/f corner is used, as indicated by block 511. If so, the process returns to block 502 and a different V/F corner is requested. The process of blocks 503-510 then repeats. The thermal mitigation logic 105 can make this determination by using Eq. 5, repeated below, to determine whether the power budget, which is $P_{TOTAL}$ in Eq. 5, will be violated using the values for V and f corresponding to the requested V/f corner.

As an example of the manner in which the power budget is computed at block 509 and utilized at block 510, it will be assumed that Tmax in Eq. 10 is equal to 95° C., that the current voltage and frequency corner values are V=1 volt (v) and f=3 Gigahertz (GHZ), respectively, and that the current power consumed, $P_{TOTAL}$, per Eq. 5, repeated below, is equal to ~50 W:

$$P_{total} = \alpha CV^2 f + V(\emptyset T^2 e^{\psi/T} + I_{gate}) \qquad \text{Eq. 5}$$

Assuming for this example that the current temperature equals 40° C., Eq. 8, repeated below, can be used to predict that the temperature will exceed 95° C. in the next 100 cycles, i.e., n=100:

$$T|k+n| = \emptyset s^n T|k| + \psi s \sum_{i=0}^{n-1} \emptyset s^i P|k+n-i-1| \qquad \text{Eq. 8}$$

Based on the current consumed power $P_{TOTAL}$=50 W over 100 cycles, the 1 v and 3 GHZ values of the current V/f corner and Tmax=$TH_{TEMP}$=95° C., Eq. 9, repeated below, is violated:

$$\max\{|\emptyset s, iT|k| + \psi s, iP|k||\} \leq |T\max| \text{ where } 1 \leq i \leq n \qquad \text{Eq. 9}$$

Thus, in order to keep the temperature below the threshold temperature $TH_{TEMP}$, which is $T_{max}$ in Eq. 9, in the next 100 cycles, the process represented by block 509 uses Eq. 10 to find the power budget based on the specific V/f corner requested at block 502. Block 510 then checks to determine whether the requested V/f corner at which the power budget is calculated at block 509 violates Eq. 9. If so, at block 502, the thermal mitigation logic 105 requests a different V/f corner that meets the constraint of Eq. 5. The process represented by blocks 503-510 is repeated until a decision is made at block 510 that the requested V/f corner does not result in a violation of Eq. 9, at which point the process proceeds to block 511 where the current requested V/f corner is used. It can be seen from Eq. 5 that the V/f corner can be modified to ensure that Eq. 5 is not violated. Thus, Eq. 5 also expresses the power budget constraint, $P_{TOTAL}$, in terms of the other parameters used in Eq. 5. Because all of the values in Eq. 5 are known for this example, the thermal mitigation logic 105 can adjust the V/f corner to ensure that Eq. 5 is not violated.

A similar process to the process represented by FIG. 5 can be performed for each of the other mitigation methods represented by blocks 402, 404 and 405 of FIG. 4 such that one or more of those thermal mitigation actions is requested and prior to taking the action a determination is made as to whether performing the action will violate the power budget.

Also, a variety of modifications can be made to the flow diagram of FIG. 5. For example, if a more suitable V/f corner than the V/f corner used at block 509 is not available, one or more of the other mitigation methods represented by blocks 402, 404 and 405 of FIG. 4 can be performed to cause the power budget constraint of block 509 to be met.

Figure 6:
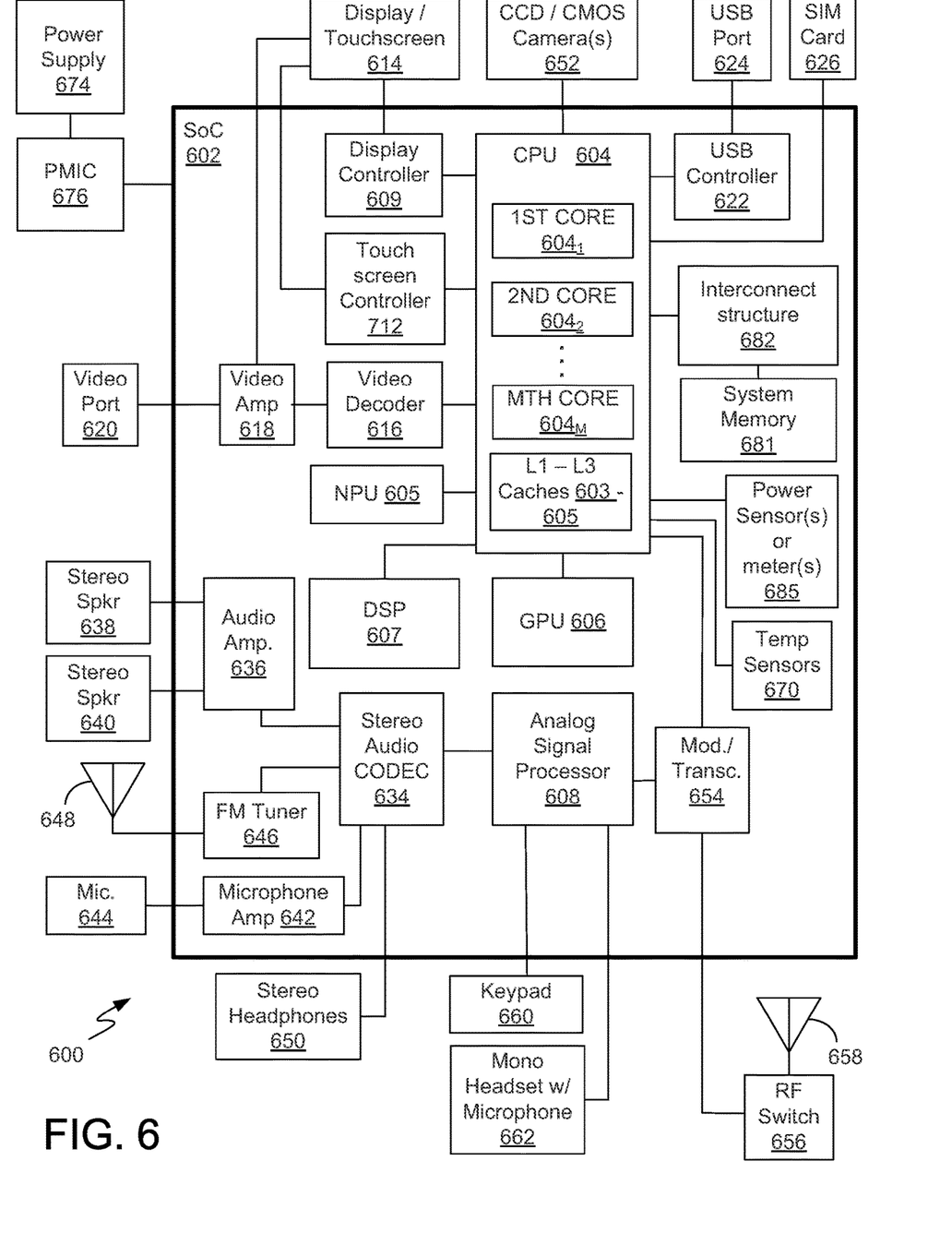
FIG. 6 illustrates an example of a PCD in which exemplary embodiments of systems, methods, computer-readable media, and other examples of providing the run-time predictive thermal mitigation solution according to the inventive principles and concepts disclosed herein may be implemented.

FIG. 6 illustrates an example of a PCD 600, such as a mobile phone, a smartphone, a portable game console such as an Extended Reality (XR) device, a Virtual Reality (VR) device, an Augmented Reality (AR) device, or a Mixed Reality (MR) device, etc., in which exemplary embodiments of systems, methods, computer-readable media, and other examples of providing the run-time predictive thermal mitigation solution according to the inventive principles and concepts disclosed herein may be implemented. For purposes of clarity, some interconnects, signals, etc., are not shown in FIG. 6.

The PCD 600 may include an SoC 602. The SoC 602 may include a CPU 604, an NPU 605, a GPU 606, a DSP 607, an analog signal processor 608, a modem/modem subsystem 654, or other processors. The CPU 604 may include one or more CPU cores, such as a first CPU core 6041, a second CPU core 6042, etc., through an $M^{th}$ CPU core 604M. The CPU 604 may also include cache memory such as, for example, level 1 (L1)-level 3 (L3) cache memory 603-605, respectively. The systems and methods of the present disclosure described above with reference to FIGS. 1-5 can be implemented in software and/or firmware executed by the CPU 604 or by any of the processors of the SoC 602, such as, for example, NPU 605, GPU 606, or DSP 607. The corresponding software and/or firmware can be stored in any non-transitory computer-readable mediums of the SoC 602 such as, for example, in system memory 681, in last level cache (LLC) of the interconnect structure 682 that interconnects the CUP 604 with the system memory 681 and/or in on-board memory of one of the processors of the SoC 602, such as in on-board memory of the CPU 604.

A display controller 609 and a touch-screen controller 612 may be coupled to the CPU 604. A touchscreen display 614 external to the SoC 602 may be coupled to the display controller 610 and the touch-screen controller 612. The PCD 600 may further include a video decoder 616 coupled to the CPU 604. A video amplifier 618 may be coupled to the video decoder 616 and the touchscreen display 614. A video port 620 may be coupled to the video amplifier 618. A universal serial bus ("USB") controller 622 may also be coupled to CPU 604, and a USB port 624 may be coupled to the USB controller 622. A subscriber identity module ("SIM") card 626 may also be coupled to the CPU 604.

The system memory 681 may include both volatile and non-volatile memories. Examples of volatile memories include static random access memory ("SRAM"), dynamic random access memory ("DRAM"), and double data rate (DDR) synchronous DRAM (SDRAM). Such memories may be external to the SoC 602 or internal to the SoC 602. The one or more memories may include local cache memory and/or a system-level cache memory. The interconnect structure 682 may be used to interconnect system memory 681 to the CPU 604.

A stereo audio CODEC 634 may be coupled to the analog signal processor 608. Further, an audio amplifier 636 may be coupled to the stereo audio CODEC 634. First and second stereo speakers 638 and 640, respectively, may be coupled to the audio amplifier 636. In addition, a microphone amplifier 642 may be coupled to the stereo audio CODEC 634, and a microphone 644 may be coupled to the microphone amplifier 642. A frequency modulation ("FM") radio tuner 646 may be coupled to the stereo audio CODEC 634. An FM antenna 648 may be coupled to the FM radio tuner 646. Further, stereo headphones 650 may be coupled to the stereo audio CODEC 634. Examples of other devices that may be coupled to the CPU 604 include one or more digital (e.g., CCD or CMOS) cameras 652.

A modem or RF transceiver 654 may be coupled to the analog signal processor 608 and the CPU 604. An RF switch 656 may be coupled to the RF transceiver 654 and an RF antenna 658. In addition, a keypad 660 and a mono headset with a microphone 662 may be coupled to the analog signal processor 608. The SoC 602 can have one or more internal or on-chip thermal sensors 670 that are located in or near the cores 6041-604M. The SoC 602 can have one or more internal or on-chip power sensors or meters 685 that are located in or near the cores 6041-604M. The measurements or readings taken by the sensors and/or meters 670 and 685 are processed in accordance with the methods described above with reference to FIGS. 1-5. A power supply 674 and a PMIC 676 may supply power to the SoC 602. One or more of the algorithms described above, or portions thereof, may be performed by the PMIC 676.

Firmware or software may be stored in any of the above-described memories, or may be stored in a local memory directly accessible by the processor hardware on which the software or firmware executes. Execution of such firmware or software may control aspects of any of the above-described methods or configure aspects any of the above-described systems. Any such memory or other non-transitory storage medium having firmware or software stored therein in computer-readable form for execution by processor hardware may be an example of a "computer-readable medium," as the term is understood in the patent lexicon.

Implementation examples are described in the following numbered clauses.

1. A method for performing predictive run-time thermal mitigation in a processor, comprising:
   with at least a first temperature sensor and a first power sensor or meter, measuring a current junction temperature, $T_{JUNC}$, value in the processor and a current consumed power, $P_{TOTAL}$, value consumed by the processor, respectively;
   predicting what a temperature, $TEMP_{PRED}$, value of the processor will be in n sample periods from a current sample period of the processor based at least in part on the current $T_{JUNC}$ and current $P_{TOTAL}$ values, where n is a positive integer; and
   if the $TEMP_{PRED}$ value exceeds a preselected temperature threshold, $TH_{TEMP}$, value, causing one or more thermal mitigation actions to be taken.

2. The method of clause 1, wherein the predicting step comprises:
   in a temperature prediction model, generating the $TEMP_{PRED}$ value based at least in part on the current $T_{JUNC}$ value and the current $P_{TOTAL}$ value.

3. The method of any of clauses 1 and 2, further comprising:
   in a power model, calculating one or more power components of the $P_{TOTAL}$ value based at least in part on the current $T_{JUNC}$ and current $P_{TOTAL}$ values, and based at least in part on a supply voltage, $V_{dd}$, value and on an operating frequency, f, value of the processor.

4. The method of clause 3, wherein said one or more power components of the $P_{TOTAL}$ value include a dynamic switching capacitance value, and wherein the step of causing one or more thermal mitigation actions to be performed comprises:

calculating a power budget based at least in part on the current $T_{JUNC}$ value, the current $P_{TOTAL}$ value, and based at least in part on thermal conductance values, thermal capacitance values and gate current, $I_{gate}$, values obtained during a characterization process performed prior to run time of the processor; and processing the power budget, the dynamic switching capacitance value, the current $P_{TOTAL}$ value and the current $T_{JUNC}$ value to determine whether or not the power budget will be violated in n clock cycles from the current clock cycle.

5. The method of any of clauses 2-4, wherein the temperature prediction model generates the $TEMP_{PRED}$ value based at least in part on the current $T_{JUNC}$ value, the current $P_{TOTAL}$ value, the thermal conductance values, the thermal capacitance values and the $I_{gate}$ values.

6. The method of any of clauses 1-5, wherein the power budget calculation is also based at least in part on a $V_{dd}/f$ corner for operating the processor, the $V_{dd}/f$ corner corresponding to the $V_{dd}$ and f values.

7. The method of clause 6, wherein the step of causing the one or more thermal mitigation actions to be performed includes determining whether the power budget will be violated if the processor operates at the $V_{dd}/f$ corner, and if so, choosing a different $V_{dd}/f$ corner at which to operate the processor.

8. The method of any of clauses 1-7, wherein said one or more thermal mitigation actions include throttling instruction execution in one or more cores of the processor to cause fewer instructions to be executed in said one or more cores during a clock cycle or series of adjacent clock cycles.

9. The method of any of clauses 1-8, wherein said one or more thermal mitigation actions include deactivating one or more processing cores of the processor to reduce power consumption of the processor.

10. The method of any of clauses 1-9, wherein said one or more thermal mitigation actions include causing an operating system (OS) of the processor to perform task migration by offloading processing tasks from one core to another core of the processor to reduce power consumption of the processor.

11. A system for performing predictive run-time thermal mitigation in a processor, the system comprising:

at least a first temperature sensor and a first power sensor or meter configured to measure a current junction temperature, $T_{JUNC}$, value and a current power, $P_{TOTAL}$, value consumed by the processor, respectively;

logic configured to predict what a temperature, $TEMP_{PRED}$, value of the processor will be in n sample periods from a current sample period of the processor based at least in part on the current $T_{JUNC}$ and current $P_{TOTAL}$ values, where n is a positive integer;

logic configured to determine if the $TEMP_{PRED}$ value exceeds a preselected temperature threshold, $TH_{TEMP}$, value; and logic configured to cause one or more thermal mitigation actions to be taken to ensure that a future $T_{JUNC}$ value measured n sample periods from the current sample period k of the processor will not exceed the $TH_{TEMP}$ value if the $TEMP_{PRED}$ value exceeds the preselected $TH_{TEMP}$ value.

12. The system of clause 11, wherein said logic configured to predict comprises:

temperature prediction model logic configured to execute a temperature prediction model to generate the $TEMP_{PRED}$ value based at least in part on the current $T_{JUNC}$ value and the current $P_{TOTAL}$ value.

13. The system of any of clauses 11-12, further comprising:

power model logic configured to execute a power model that calculates one or more power components of the $P_{TOTAL}$ value based at least in part on the current $T_{JUNC}$ and current $P_{TOTAL}$ values, and based at least in part on a supply voltage, $V_{dd}$, value and on an operating frequency, f, value of the processor.

14. The system of clause 13, wherein said one or more power components of the $P_{TOTAL}$ include a dynamic switching capacitance value, and wherein the logic configured to cause said one or more thermal mitigation actions to be taken comprises:

power budget calculation logic configured to calculate a power budget based at least in part on the current $T_{JUNC}$ value, the current $P_{TOTAL}$ value, and based at least in part on thermal conductance values, thermal capacitance values and gate current, $I_{gate}$, values obtained during a characterization process performed prior to run time of the processor; and thermal mitigation logic configured to process the power budget, the dynamic switching capacitance value, the current $P_{TOTAL}$ value and the current $T_{JUNC}$ value to determine whether or not the power budget will be violated in n clock cycles from the current clock cycle.

15. The system of clauses 12-14, wherein the temperature prediction model logic generates the $TEMP_{PRED}$ value based at least in part on the current $T_{JUNC}$ value, the current $P_{TOTAL}$ value, the thermal conductance values, the thermal capacitance values and the $I_{gate}$ values.

16. The system of any of clauses 14-15, wherein the power budget calculation logic also bases the power budget calculation at least in part on a $V_{dd}/f$ corner for operating the processor, the $V_{dd}/f$ corner corresponding to the $V_{dd}$ and f values.

17. The system of clause 16, wherein the thermal mitigation logic further comprises logic configured to determine whether the power budget will be violated if the processor operates at the $V_{dd}/f$ corner, and if so, to choose a different $V_{dd}/f$ corner at which to operate the processor.

18. The system of any of clauses 11-17, wherein said one or more thermal mitigation actions include throttling instruction execution in one or more cores of the processor to cause fewer instructions to be executed in said one or more cores during a clock cycle or series of adjacent clock cycles to reduce power consumption of the processor.

19. The system of any of clauses 11-18, wherein said one or more thermal mitigation actions include deactivating one or more processing cores of the processor.

20. The system of any of clauses 11-18, wherein said one or more thermal mitigation actions include causing an operating system (OS) of the processor to perform task migration by offloading processing tasks from one core to another core of the processor.

21. A computer program embodied on a nontransitory computer-readable medium and comprising computer instructions for execution by a processor for causing the processor to perform predictive run-time thermal mitigation in a processor, the computer program comprising:

a first set of computer instructions for receiving a current junction temperature, $T_{JUNC}$, value and a current power, $P_{TOTAL}$, value consumed by the processor measured by at least a first temperature sensor and a first power sensor or meter, respectively;

a second set of computer instructions for predicting what a temperature, $TEMP_{PRED}$, value of the processor will be in n sample periods from a current sample period, k, of the processor based at least in part on the current $T_{JUNC}$ and current $P_{TOTAL}$ values, where k and n are positive integers;

a third set of computer instructions for determining if the $TEMP_{PRED}$ value exceeds a preselected temperature threshold, $TH_{TEMP}$, value; and a fourth set of computer instructions for causing one or more thermal mitigation actions to be taken if the $TEMP_{PRED}$ value exceeds the preselected $TH_{TEMP}$ value.

22. The computer program of clause 21, wherein said second set of computer instructions comprises:

a temperature prediction model that generates the $TEMP_{PRED}$ value based at least in part on the current $T_{JUNC}$ value and the current $P_{TOTAL}$ value.

23. The computer program of any of clauses 21-22, further comprising:

a fifth set of computer instructions comprising a power model that calculates one or more power components of the $P_{TOTAL}$ value based at least in part on the current $T_{JUNC}$ and current $P_{TOTAL}$ values, and based at least in part on a supply voltage, $V_{dd}$, value and on an operating frequency, f, value of the processor.

24. The computer program of clause 23, wherein said one or more power components of the $P_{TOTAL}$ value include a dynamic switching capacitance value, and wherein the computer program further comprises:

a sixth set of computer instructions for calculating a power budget based at least in part on the current $T_{JUNC}$ value and the current $P_{TOTAL}$ value and based at least in part on thermal conductance values, thermal capacitance values and gate current, $I_{gate}$, values obtained during a characterization process performed prior to run time of the processor; and a seventh set of computer instructions for processing at least the power budget, the dynamic switching capacitance value, the current $P_{TOTAL}$ value and the current $T_{JUNC}$ value to determine whether or not the power budget will be violated in n clock cycles from the current clock cycle.

25. The computer program of any of clauses 22-24, wherein the temperature prediction model generates the $TEMP_{PRED}$ value based at least in part on the current $T_{JUNC}$ value, the current $P_{TOTAL}$ value, the thermal conductance values, the thermal capacitance values and the $I_{gate}$ values.

26. The computer program of any of clauses 24-25, wherein the sixth set of computer instructions also bases the power budget calculation at least in part on a $V_{dd}/f$ corner for operating the processor, the $V_{dd}/f$ corner corresponding to the $V_{dd}$ and f values.

27. The computer program of any of clauses 24-26, wherein the seventh set of computer instructions that processes the power budget, the dynamic switching capacitance value, the current $P_{TOTAL}$ value and the current $T_{JUNC}$ value to determine whether or not the power budget is violated also processes the $V_{dd}$ and f values to determine whether the power budget will be violated if the processor operates at the $V_{dd}/f$ corner, and if so, causes a different $V_{dd}/f$ corner at which to operate the processor to be chosen.

28. The computer program of any of clauses 21-27, wherein the fourth set of computer instructions includes computer instructions for throttling instruction execution in one or more cores of the processor to cause fewer instructions to be executed in said one or more cores during a clock cycle or series of adjacent clock cycles to reduce power consumption of the processor.

29. The computer program of any of clauses 21-28, wherein the fourth set of computer instructions includes computer instructions for performing at least one of deactivating one or more processing cores of the processor and causing an operating system (OS) of the processor to perform task migration by offloading processing tasks from one core to another core of the processor.

30. A system for performing predictive run-time thermal mitigation in a processor, the system comprising:

at least a first temperature sensor and a first power sensor or meter configured to measure a current junction temperature, $T_{JUNC}$, value and a current power, $P_{TOTAL}$, value consumed by the processor, respectively;

means for predicting what a temperature, $TEMP_{PRED}$, value of the processor will be in n sample periods from a current sample period of the processor based at least in part on the current $T_{JUNC}$ value and the current $P_{TOTAL}$ value, where n is a positive integer;

means for determining if the $TEMP_{PRED}$ value exceeds a preselected temperature threshold, $TH_{TEMP}$, value; and means for causing one or more thermal mitigation actions to be taken if the $TEMP_{PRED}$ value exceeds the preselected $TH_{TEMP}$ value.

Alternative embodiments will become apparent to one of ordinary skill in the art to which the invention pertains. Therefore, although selected aspects have been illustrated and described in detail, it will be understood that various substitutions and alterations may be made therein.

What is claimed is:

1. A method for performing predictive run-time thermal mitigation in a processor, comprising:

with at least a first temperature sensor and a first power sensor or meter, measuring a current junction temperature, $T_{JUNC}$, value in the processor and a current consumed power, $P_{TOTAL}$, value consumed by the processor, respectively;

predicting what a temperature, $TEMP_{PRED}$, value of the processor will be in n sample periods from a current sample period of the processor based at least in part on the current $T_{JUNC}$ and current $P_{TOTAL}$ values, where n is a positive integer, and generating the $TEMP_{PRED}$ Value based at least in part on the current $T_{JUNC}$ value and the current $P_{TOTAL}$ value;

if the $TEMP_{PRED}$ value exceeds a preselected temperature threshold, $TH_{TEMP}$, value, causing one or more thermal mitigation actions to be taken; and in a power model, calculating one or more power components of the $P_{TOTAL}$ value based at least in part on the current $T_{JUNC}$ and current $P_{TOTAL}$ values, and based at least in part on a supply voltage, $V_{dd}$, value and on an operating frequency, f, value of the processor, wherein said one or more power components of the $P_{TOTAL}$ value include a dynamic switching capacitance value.

2. The method of claim 1, wherein the step of causing one or more thermal mitigation actions to be performed comprises:

calculating a power budget based at least in part on the current $T_{JUNC}$ value, the current $P_{TOTAL}$ value, and based at least in part on thermal conductance values, thermal capacitance values and gate current, $I_{gate}$, values obtained during a characterization process performed prior to run time of the processor; and processing the power budget, the dynamic switching capacitance value, the current $P_{TOTAL}$ value and the current $T_{JUNC}$ value to determine whether or not the power budget will be violated in n clock cycles from the current clock cycle.

3. The method of claim 2, wherein the temperature prediction model generates the $TEMP_{PRED}$ value based at least in part on the current $T_{JUNC}$ value, the current $P_{TOTAL}$ value, the thermal conductance values, the thermal capacitance values and the $I_{gate}$ values.

4. The method of claim 2, wherein the power budget calculation is also based at least in part on a $V_{dd}/f$ corner for operating the processor, the $V_{dd}/f$ corner corresponding to the $V_{dd}$ and f values.

5. The method of claim 4, wherein the step of causing the one or more thermal mitigation actions to be performed includes determining whether the power budget will be violated if the processor operates at the $V_{dd}/f$ corner, and if so, choosing a different $V_{dd}/f$ corner at which to operate the processor.

6. The method of claim 1, wherein said one or more thermal mitigation actions include throttling instruction execution in one or more cores of the processor to cause fewer instructions to be executed in said one or more cores during a clock cycle or series of adjacent clock cycles.

7. The method of claim 1, wherein said one or more thermal mitigation actions include deactivating one or more processing cores of the processor to reduce power consumption of the processor.

8. The method of claim 1, wherein said one or more thermal mitigation actions include causing an operating system (OS) of the processor to perform task migration by offloading processing tasks from one core to another core of the processor to reduce power consumption of the processor.

9. A system for performing predictive run-time thermal mitigation in a processor, the system comprising:
   at least a first temperature sensor and a first power sensor or meter configured to measure a current junction temperature, $T_{JUNC}$, value and a current power, $P_{TOTAL}$, value consumed by the processor, respectively;
   logic configured to predict what a temperature, $TEMP_{PRED}$, value of the processor will be in n sample periods from a current sample period of the processor based at least in part on the current $T_{JUNC}$ and current $P_{TOTAL}$ values, where n is a positive integer, and the logic further configured to generate the $TEMP_{PRED}$ value based at least in part on the current $T_{JUNC}$ value and the current $P_{TOTAL}$ value;
   logic configured to determine if the $TEMP_{PRED}$ value exceeds a preselected temperature threshold, $TH_{TEMP}$, value;
   logic configured to cause one or more thermal mitigation actions to be taken to ensure that a future $T_{JUNC}$ value measured n sample periods from the current sample period k of the processor will not exceed the $TH_{TEMP}$ value if the $TEMP_{PRED}$ value exceeds the preselected $TH_{TEMP}$ value; and
   power model logic configured to execute a power model that calculates one or more power components of the $P_{TOTAL}$ value based at least in part on the current $T_{JUNC}$ and current $P_{TOTAL}$ values, and based at least in part on a supply voltage, $V_{dd}$, value and on an operating frequency, f, value of the processor, wherein said one or more power components of the $P_{TOTAL}$ include a dynamic switching capacitance value.

10. The system of claim 9, wherein the logic configured to cause said one or more thermal mitigation actions to be taken comprises:
    power budget calculation logic configured to calculate a power budget based at least in part on the current $T_{JUNC}$ value, the current $P_{TOTAL}$ value, and based at least in part on thermal conductance values, thermal capacitance values and gate current, $I_{gate}$, values obtained during a characterization process performed prior to run time of the processor; and
    thermal mitigation logic configured to process the power budget, the dynamic switching capacitance value, the current $P_{TOTAL}$ value and the current $T_{JUNC}$ value to determine whether or not the power budget will be violated in n clock cycles from the current clock cycle.

11. The system of claim 10, wherein the temperature prediction model logic generates the $TEMP_{PRED}$ value based at least in part on the current $T_{JUNC}$ value, the current $P_{TOTAL}$ value, the thermal conductance values, the thermal capacitance values and the $I_{gate}$ values.

12. The system of claim 10, wherein the power budget calculation logic also bases the power budget calculation at least in part on a $V_{dd}/f$ corner for operating the processor, the $V_{dd}/f$ corner corresponding to the $V_{dd}$ and f values.

13. The system of claim 12, wherein the thermal mitigation logic further comprises logic configured to determine whether the power budget will be violated if the processor operates at the $V_{dd}/f$ corner, and if so, to choose a different $V_{dd}/f$ corner at which to operate the processor.

14. The system of claim 9, wherein said one or more thermal mitigation actions include throttling instruction execution in one or more cores of the processor to cause fewer instructions to be executed in said one or more cores during a clock cycle or series of adjacent clock cycles to reduce power consumption of the processor.

15. The system of claim 9, wherein said one or more thermal mitigation actions include deactivating one or more processing cores of the processor.

16. The system of claim 9, wherein said one or more thermal mitigation actions include causing an operating system (OS) of the processor to perform task migration by offloading processing tasks from one core to another core of the processor.

17. A computer program embodied on a nontransitory computer-readable medium and comprising computer instructions for execution by a processor for causing the processor to perform predictive run-time thermal mitigation in a processor, the computer program comprising:
    a first set of computer instructions for receiving a current junction temperature, $T_{JUNC}$, value and a current power, $P_{TOTAL}$, value consumed by the processor measured by at least a first temperature sensor and a first power sensor or meter, respectively;
    a second set of computer instructions for predicting what a temperature, $TEMP_{PRED}$, value of the processor will be in n sample periods from a current sample period, k, of the processor based at least in part on the current $T_{JUNC}$ and current $P_{TOTAL}$ values, where k and n are positive integers, the second set of instructions further includes a temperature prediction model that generates the $TEMP_{PRED}$ value based at least in part on the current $T_{JUNC}$ value and the current $P_{TOTAL}$ value;
    a third set of computer instructions for determining if the $TEMP_{PRED}$ value exceeds a preselected temperature threshold, $TH_{TEMP}$, value;
    a fourth set of computer instructions for causing one or more thermal mitigation actions to be taken if the $TEMP_{PRED}$ value exceeds the preselected $TH_{TEMP}$ value; and
    a fifth set of computer instructions comprising a power model that calculates one or more power components of the $P_{TOTAL}$ value based at least in part on the current $T_{JUNC}$ and current $P_{TOTAL}$ values, and based at least in part on a supply voltage, $V_{dd}$, value and on an operating frequency, f, value of the processor, wherein said one or more power components of the $P_{TOTAL}$ value include a dynamic switching capacitance value.

18. The computer program of claim 17, wherein the computer program further comprises:
a sixth set of computer instructions for calculating a power budget based at least in part on the current $T_{JUNC}$ value and the current $P_{TOTAL}$ value and based at least in part on thermal conductance values, thermal capacitance values and gate current, $I_{gate}$, values obtained during a characterization process performed prior to run time of the processor; and
a seventh set of computer instructions for processing at least the power budget, the dynamic switching capacitance value, the current $P_{TOTAL}$ value and the current $T_{JUNC}$ value to determine whether or not the power budget will be violated in n clock cycles from the current clock cycle.

19. The computer program of claim 18, wherein the temperature prediction model generates the $TEMP_{PRED}$ value based at least in part on the current $T_{JUNC}$ value, the current $P_{TOTAL}$ value, the thermal conductance values, the thermal capacitance values and the $I_{gate}$ values.

20. The computer program of claim 18, wherein the sixth set of computer instructions also bases the power budget calculation at least in part on a $V_{dd}/f$ corner for operating the processor, the $V_{dd}/f$ corner corresponding to the $V_{dd}$ and f values.

21. The computer program of claim 18, wherein the seventh set of computer instructions that processes the power budget, the dynamic switching capacitance value, the current $P_{TOTAL}$ value and the current $T_{JUNC}$ value to determine whether or not the power budget is violated also processes the $V_{dd}$ and f values to determine whether the power budget will be violated if the processor operates at the $V_{dd}/f$ corner, and if so, causes a different $V_{dd}/f$ corner at which to operate the processor to be chosen.

22. The computer program of claim 17, wherein the fourth set of computer instructions includes computer instructions for throttling instruction execution in one or more cores of the processor to cause fewer instructions to be executed in said one or more cores during a clock cycle or series of adjacent clock cycles to reduce power consumption of the processor.

23. The computer program of claim 17, wherein the fourth set of computer instructions includes computer instructions for performing at least one of deactivating one or more processing cores of the processor and causing an operating system (OS) of the processor to perform task migration by offloading processing tasks from one core to another core of the processor.

24. A system for performing predictive run-time thermal mitigation in a processor, the system comprising:
at least a first temperature sensor and a first power sensor or meter configured to measure a current junction temperature, $T_{JUNC}$, value and a current power, $P_{TOTAL}$, value consumed by the processor, respectively;
means for predicting what a temperature, $TEMP_{PRED}$, value of the processor will be in n sample periods from a current sample period of the processor based at least in part on the current $T_{JUNC}$ value and the current $P_{TOTAL}$ value, where n is a positive integer, and the means for predicting generates the $TEMP_{PRED}$ value based at least in part on the current $T_{JUNC}$ value and the current $P_{TOTAL}$ value;
means for determining if the $TEMP_{PRED}$ value exceeds a preselected temperature threshold, $TH_{TEMP}$, value;
means for causing one or more thermal mitigation actions to be taken if the $TEMP_{PRED}$ value exceeds the preselected $TH_{TEMP}$ value; and
means for executing a power model that calculates one or more power components of the $P_{TOTAL}$ value based at least in part on the current $T_{JUNC}$ and current $P_{TOTAL}$ values, and based at least in part on a supply voltage, $V_{dd}$, value and on an operating frequency, f, value of the processor, wherein said one or more power components of the $P_{TOTAL}$ include a dynamic switching capacitance value.

* * * * *